J. H. MILLER.
STEERING WHEEL FOR PLOWS.
APPLICATION FILED AUG. 9, 1912.

1,090,935.

Patented Mar. 24, 1914.

Witnesses

James H. Miller,
Inventor by

Attorneys

UNITED STATES PATENT OFFICE.

JAMES H. MILLER, OF GENESEO, KANSAS.

STEERING-WHEEL FOR PLOWS.

1,090,935.

Specification of Letters Patent. Patented Mar. 24, 1914.

Application filed August 9, 1912. Serial No. 714,291.

*To all whom it may concern:*

Be it known that I, JAMES H. MILLER, a citizen of the United States, residing at Geneseo, in the county of Rice and State of Kansas, have invented a new and useful Steering-Wheel for Plows, of which the following is a specification.

The present invention appertains to steering mechanisms, and aims to provide a novel and improved means for controlling the steering wheel of a wheel mounted plow.

Figure 1:
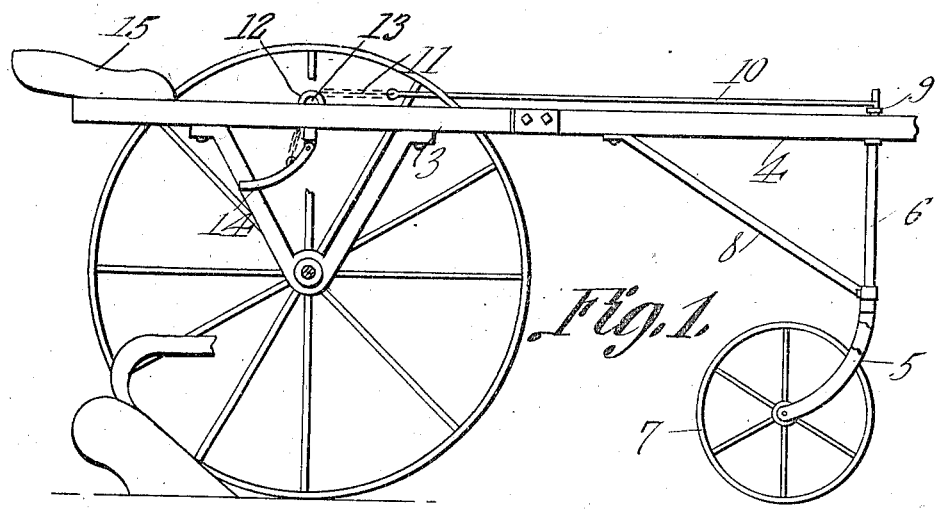
Figure 2:
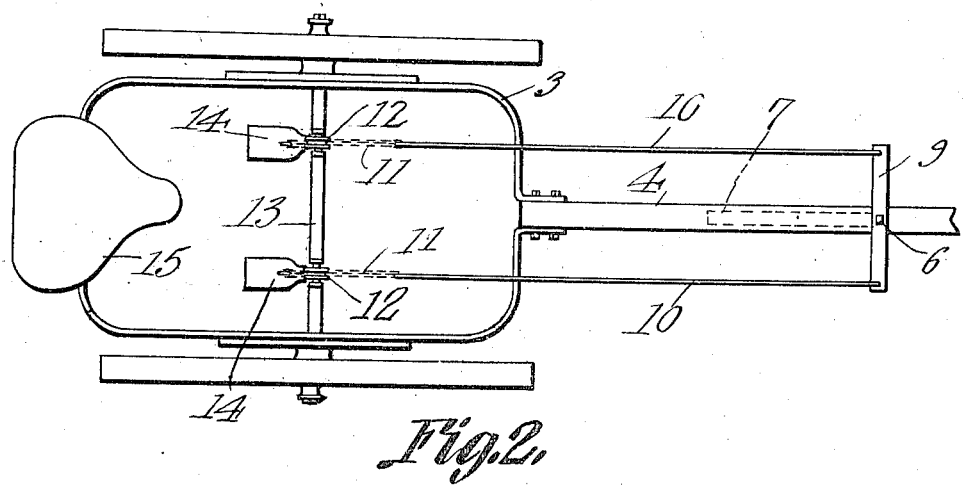

In the accompanying drawings:—Figure 1 is a fragmental side elevation of the wheel mounted plow embodying the present invention. Fig. 2 is a plan view thereof, portions being broken away, and the plow being removed.

Referring specifically to the drawings, the number 3 designates a rectangular plow frame, which is carried by suitable ground wheels, and which is equipped with a tongue 4.

In carrying out the present invention, a fork 5 has its shank or stem journaled through the tongue 4, and a steering wheel 7 is journaled between the arms of the fork to engage the soil in advance of the plow. A brace 8 is secured to the tongue 4 and the shank 6 of the fork to more effectively hold the fork in proper position, the lower end of the brace loosely embracing the shank of the fork to permit the fork to rotate freely. A lever 9 is attached at an intermediate point to the upper end of the shank 6, directly above the tongue 4, and has its ends projecting laterally relative to the tongue. To the ends of the lever 9 are attached draft rods 10, which extend rearwardly over the forward end of the frame 3, and which have short chains or flexible elements 11 attached to their rear ends. The chains 11 are trained over the pulleys or rotary guides 12 mounted on a cross piece 13 carried by the intermediate portion of the frame 3, and the other ends of the chains 11 are secured to treadles 14 fulcrumed to the cross piece 13 directly below the respective pulleys. The treadles project rearwardly from the cross piece 13 and are arranged in advance of a suitable operator's seat 15 carried by the rear end of the frame, in order that the operator may place his feet upon the treadles to swing the same.

In use, the operator may readily swing the steering wheel by depressing one or the other of the treadles, the position of the steering wheel being determined by the position at which the treadles are held by the feet of the operator. It will be observed that when the treadles are released, the steering wheel may run idle, the steering wheel preferably being of the caster type. Particular attention is directed to the fact that when the respective treadles are swung downwardly, those portions of the flexible elements between the pulleys and treadles will move to and from the fulcrums of the treadles. In this manner when one treadle is depressed the respective flexible elements will be carried toward the fulcrum of the treadle, and as a result, the strain transmitted to the treadle will be directed practically on a line passing through the fulcrum of the treadle. Consequently, the steering wheel may be held to one side or the other by the respective treadles, in a highly efficient manner. If one of the treadles is depressed and swung forwardly sufficiently, the respective flexible element 11 will be locked over the fulcrum of the treadle, so that the steering wheel may be most efficiently held toward the side to which it is turned, there being little tendency to swing the treadle back to normal position due to the steering wheel engaging the soil.

What is claimed is:

In combination with a wheel mounted frame, a front steering wheel carried thereby, a pair of rotary guides carried by the frame, a pair of treadles fulcrumed to the frame directly below the respective guides, and flexible members connecting the respective treadles and steering wheel and passing over the guides, the free ends of the treadles projecting rearwardly so that when the respective treadles are swung, those portions of the flexible members between the guides and treadles will move to and from the fulcrums of the treadles.

In testimony that I claim the foregoing as my own, I have hereto affixed my signature in the presence of two witnesses.

JAMES H. MILLER.

Witnesses:
I. R. KREHBIEL,
JAMES SHANNON.